United States Patent
Huang

(10) Patent No.: US 11,952,065 B2
(45) Date of Patent: Apr. 9, 2024

(54) VEHICLE RESTRICTION MECHANISM AND VEHICLE CARRIER INCLUDING THE SAME

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 249 days.

(21) Appl. No.: 17/542,578

(22) Filed: Dec. 6, 2021

(65) Prior Publication Data
US 2023/0174179 A1    Jun. 8, 2023

(51) Int. Cl.
*B60R 9/10* (2006.01)
*B60R 9/06* (2006.01)
*B62H 3/00* (2006.01)

(52) U.S. Cl.
CPC ..................... *B62H 3/00* (2013.01)

(58) Field of Classification Search
CPC ..................... B60R 9/10; B60R 9/06
USPC ........................................ 224/42.4
See application file for complete search history.

(56) References Cited

U.S. PATENT DOCUMENTS

| | | | | |
|---|---|---|---|---|
| 5,186,197 A * | 2/1993 | Lavine | ................. | A45B 19/00 135/25.4 |
| 6,575,182 B2 * | 6/2003 | Tung | ................. | A45B 25/14 135/20.1 |
| 6,779,536 B2 * | 8/2004 | Kuo | ................. | A45B 9/02 135/25.4 |
| 7,219,911 B2 * | 5/2007 | Sukonthapanich | ....... | B60R 3/02 280/166 |
| 7,240,816 B2 * | 7/2007 | Tsai | ................. | B60R 9/10 211/195 |
| 8,235,267 B2 * | 8/2012 | Sautter | ................. | B60R 9/10 224/532 |
| 8,640,888 B2 * | 2/2014 | Liu | ................. | B60R 9/10 224/501 |
| 9,649,986 B2 * | 5/2017 | Pedrini | ................. | B60R 9/10 |
| 9,802,549 B1 * | 10/2017 | Shen | ................. | B60R 9/10 |
| 10,093,243 B2 * | 10/2018 | Shen | ................. | B60R 9/10 |
| 10,183,627 B1 * | 1/2019 | Liu | ................. | B60R 9/06 |
| 10,906,473 B1 * | 2/2021 | Yu | ................. | B60R 9/06 |
| 11,072,294 B2 * | 7/2021 | Fehr | ................. | B60R 9/10 |
| 11,091,099 B1 * | 8/2021 | Shen | ................. | B60R 9/06 |

(Continued)

*Primary Examiner* — Scott T McNurlen
*Assistant Examiner* — Lester L Vanterpool
(74) *Attorney, Agent, or Firm* — MUNCY, GEISSLER, OLDS & LOWE, P.C.

(57) ABSTRACT

A vehicle restriction mechanism and a vehicle carrier including the same are provided, and the vehicle restriction mechanism is configured to be disposed on a supporting arm of the vehicle carrier and includes a base and a stem member. The base includes a sleeve portion, and the sleeve portion defines an axial direction. The stem member is adjustably positioned on the sleeve portion, and the stem member is rotatable between a restricted position and a release position relative to the base about the axial direction. One of the base and the stem member has a first guiding portion, and the other of the base and the stem member has a second guiding portion movably connected with the first guiding portion. Relative to an outermost bottom surface of the base, heights of at least two parts of the first guiding portion are different in the axial direction.

8 Claims, 8 Drawing Sheets

(56) References Cited

U.S. PATENT DOCUMENTS

| | | | | |
|---|---|---|---|---|
| D946,490 S | * | 3/2022 | Li | D12/408 |
| D947,752 S | * | 4/2022 | Yu | D12/408 |
| D952,539 S | * | 5/2022 | Shen | D12/407 |
| D955,969 S | * | 6/2022 | Huang | D12/407 |
| D955,970 S | * | 6/2022 | Shen | D12/407 |
| D964,254 S | * | 9/2022 | Huang | D12/407 |
| 2008/0230579 A1 | * | 9/2008 | Wang | B60R 9/10 224/400 |
| 2009/0120984 A1 | * | 5/2009 | Sautter | B60R 9/10 224/532 |
| 2010/0320247 A1 | * | 12/2010 | Wang | B60R 9/10 224/567 |
| 2013/0062383 A1 | * | 3/2013 | Jeli | B60R 9/10 224/549 |
| 2022/0144183 A1 | * | 5/2022 | Peng | B60R 9/10 |
| 2022/0185405 A1 | * | 6/2022 | Huang | B62H 3/10 |
| 2022/0212737 A1 | * | 7/2022 | Huang | B62H 5/005 |

\* cited by examiner

VEHICLE RESTRICTION MECHANISM AND VEHICLE CARRIER INCLUDING THE SAME

BACKGROUND OF THE INVENTION

Field of the Invention

The present invention relates to a vehicle restriction mechanism and a vehicle carrier including the same.

Description of the Prior Art

A conventional vehicle carrier includes a base frame configured to be assembled with a vehicle, a carrying frame connected with the base frame and configured to carry at least one bicycle and a supporting arm laterally connected with the base frame. The supporting arm may have restriction members, such as straps or hooks, so as to restrict a frame of the bicycle for stable carrying.

However, the restriction members are non-rotatably connected with the supporting arm and are easy to be interfered with the bicycle during loading and unloading the bicycle. Therefore, for loading and unloading the bicycle, each of the restriction members has to be moved to a position higher than the bicycle to avoid interference with the bicycle, which is inconvenient to use.

The present invention is, therefore, arisen to obviate or at least mitigate the above-mentioned disadvantages.

SUMMARY OF THE INVENTION

The main object of the present invention is to provide a vehicle restriction mechanism and a vehicle carrier including the same, and the vehicle restriction mechanism has a simple structure and is easy to adjust to facilitate loading and unloading of a bicycle.

To achieve the above and other objects, the present invention provides a vehicle restriction mechanism, configured to be disposed on a supporting arm of the vehicle carrier, including: a base and a stem member. The base is configured to be disposed on the supporting arm and includes a sleeve portion, and the sleeve portion defines an axial direction. The stem member is adjustably and positionably disposed on the sleeve portion, and the stem member is rotatable about the axial direction relative to the base between a restricted position and a release position. One of the base and the stem member has a first guiding portion, and the other of the base and the stem member has a second guiding portion movably connected with the first guiding portion. Relative to an outermost bottom surface of the base, heights of at least two parts of the first guiding portion are different in the axial direction. When the stem member is rotated relative to the base, the second guiding portion is moved relative to the first guiding portion and drives the stem member to move relative to the base in the axial direction.

To achieve the above and other objects, the present invention further provides a vehicle carrier, including at least one of the vehicle restriction mechanism as described above, further including: a carrying frame, having the supporting arm and configured for at least one bicycle to disposed thereon, the stem member configured to restrict the at least one bicycle.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
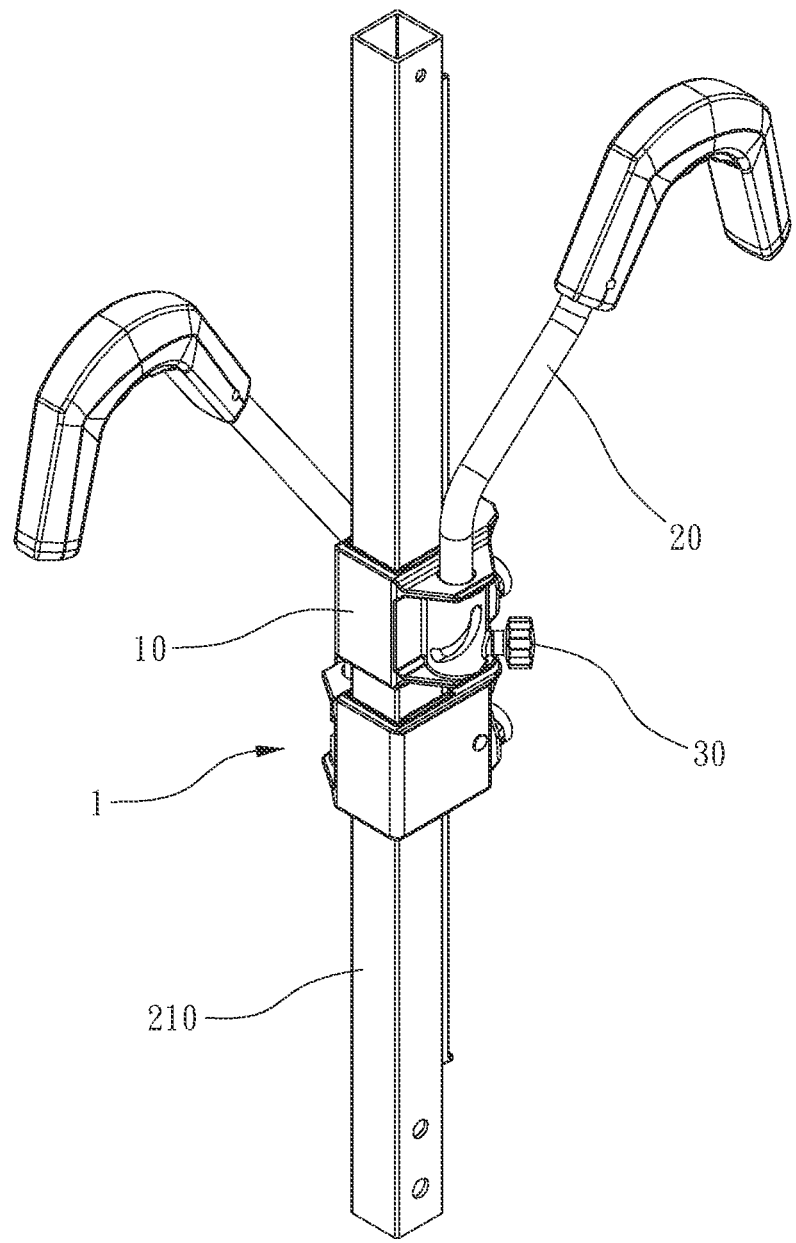
FIG. 1 is a stereogram showing a stem member in a restricted position according to a preferable embodiment of the present invention.
Figure 2:
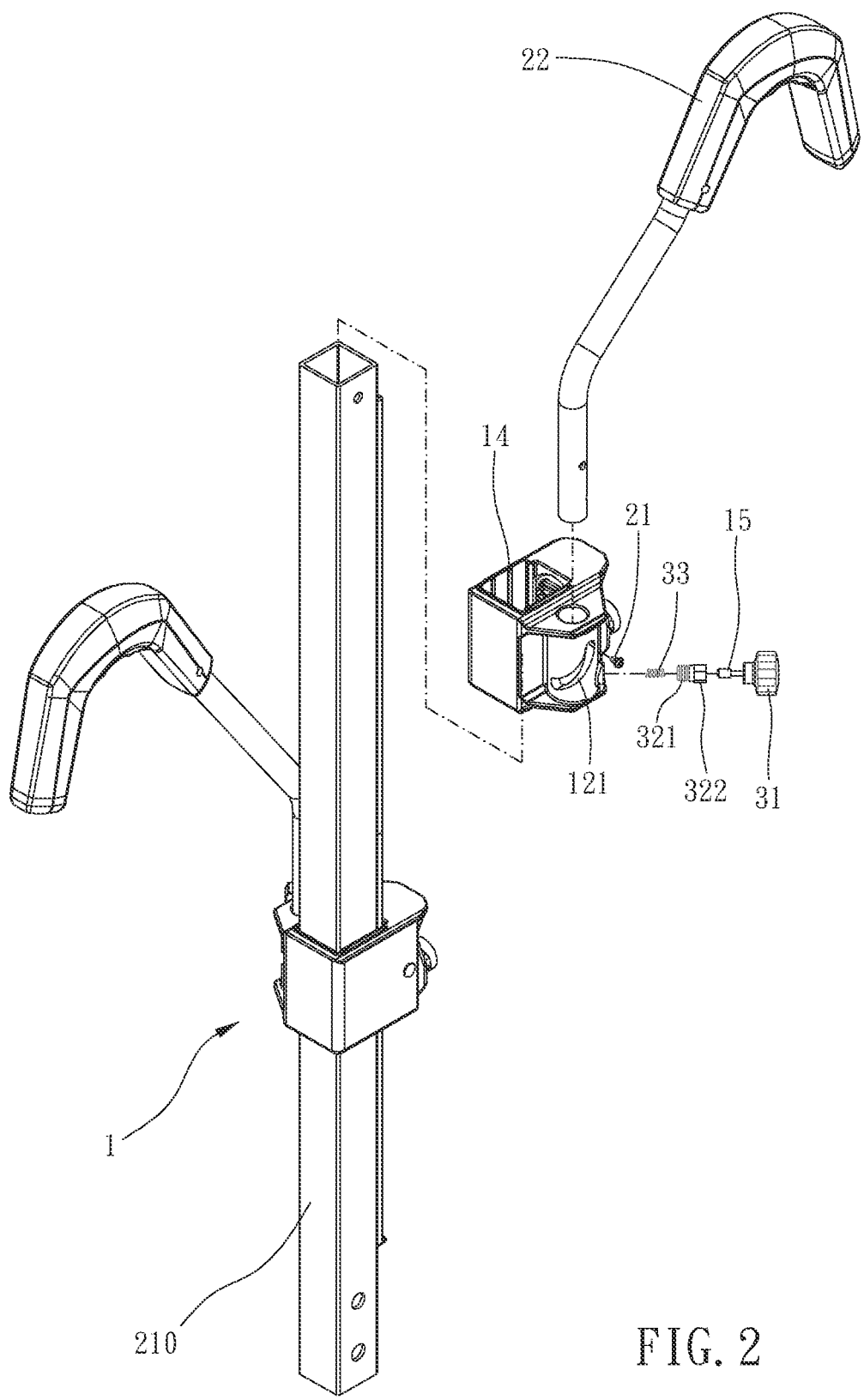
FIG. 2 is a partial breakdown drawing of a preferable embodiment of the present invention.
Figure 3:
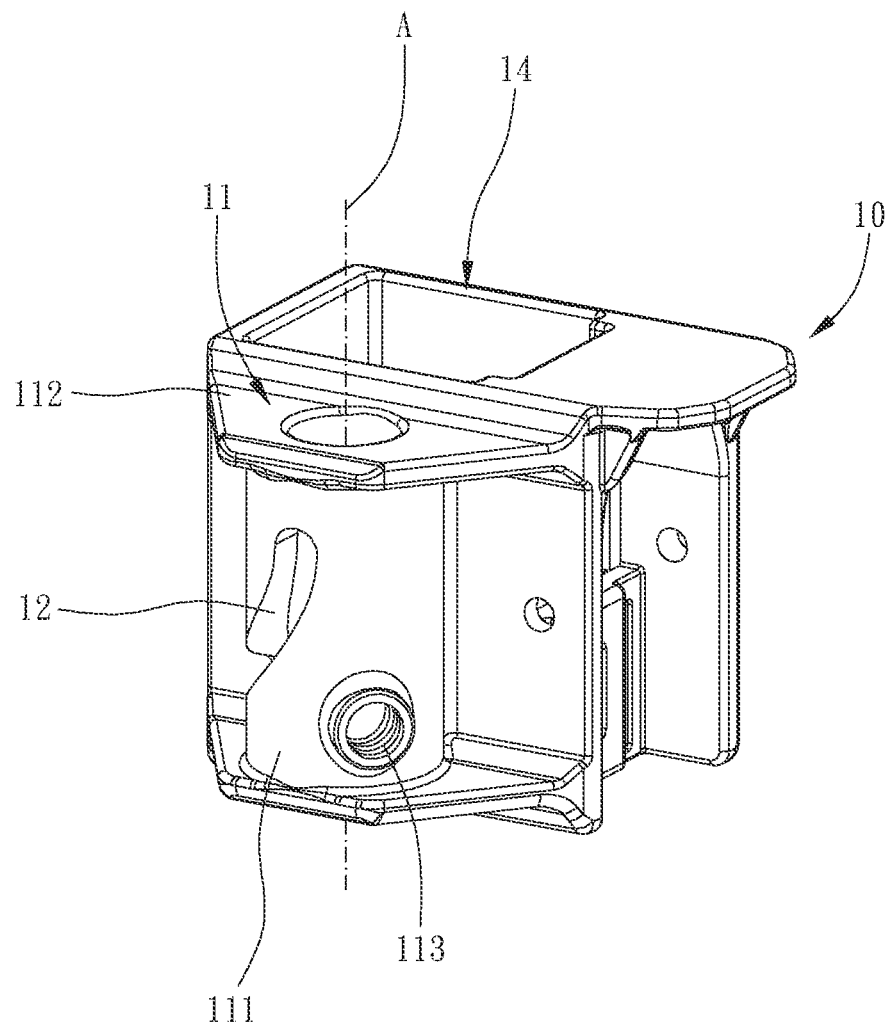
FIG. 3 is a stereogram showing a base according to a preferable embodiment of the present invention.

Please refer to FIGS. 1 to 8 for a preferable embodiment of the present invention. A vehicle restriction mechanism 1 of the present invention is configured to be disposed on a supporting arm 210 of a vehicle carrier 2, including: a base 10 and a stem member 20.

The base 10 is configured to be disposed on the supporting arm 210 and includes a sleeve portion 11, and the sleeve portion 11 defines an axial direction A. The stem member 20 is adjustably and positionably disposed on the sleeve portion 11, and the stem member 20 is rotatable about the axial direction A relative to the base 10 between a restricted position and a release position. One of the base 10 and the stem member 20 has a first guiding portion 12, and the other of the base 10 and the stem member 20 has a second guiding portion 21 movably connected with the first guiding portion 12. Relative to an outermost bottom surface 13 of the base 10, heights of at least two parts of the first guiding portion 12 are different in the axial direction A. When the stem member 20 is rotated relative to the base 10, the second guiding portion 21 is moved relative to the first guiding portion 12 and drives the stem member 20 to move relative to the base 10 in the axial direction A, which is easy to adjust and facilitates loading and unloading of a bicycle 3.

The base 10 further includes a seat portion 14 configured to be sleevingly disposed on the supporting arm 210, and the sleeve portion 11 includes a barrel 111 and at least one flange 112 radially extending from the barrel 111 and connected with the seat portion 14. The stem member 20 is rotatably disposed within the barrel 111, which is easy to process and assemble and is conducive to lightweight. In this embodiment, the seat portion 14 and the sleeve portion 11 are integrally formed as one piece; the sleeve portion 11 includes two said flanges 112, and each of the two said flanges 112 radially extending integrally from the barrel 111. An outer contour of each of the two said flanges 112 is trapezoidal and gradually expands toward the seat portion 14 so as to have good structural strength. In other embodiments, the seat portion and the sleeve portion may be made individually; the outer contour of each of the two said flanges may be round, rectangular or in any other shape; each of the two said flanges may be connected between the barrel and the seat portion by engagement, welding, or the like.

Figure 6:
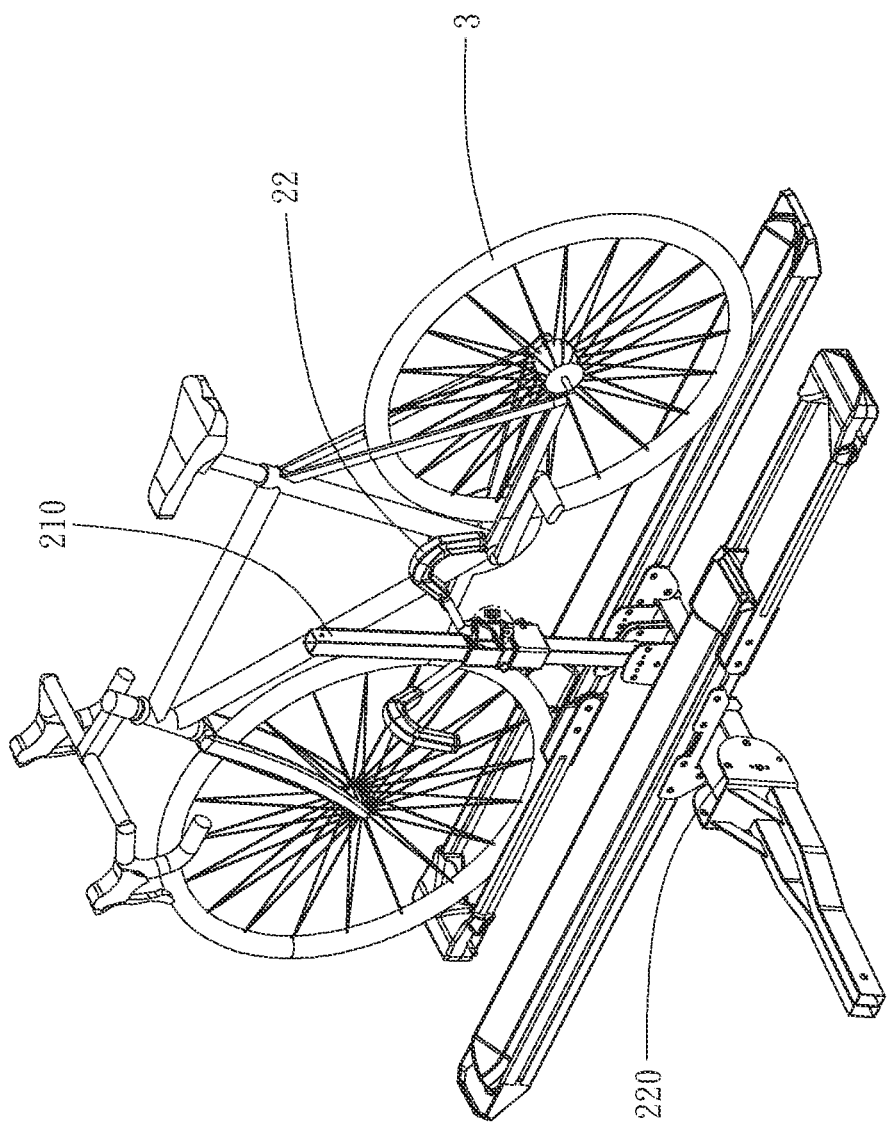
FIGS. 6 and 7 are schematic diagrams showing operation of a preferable embodiment of the present invention.
Figure 7:
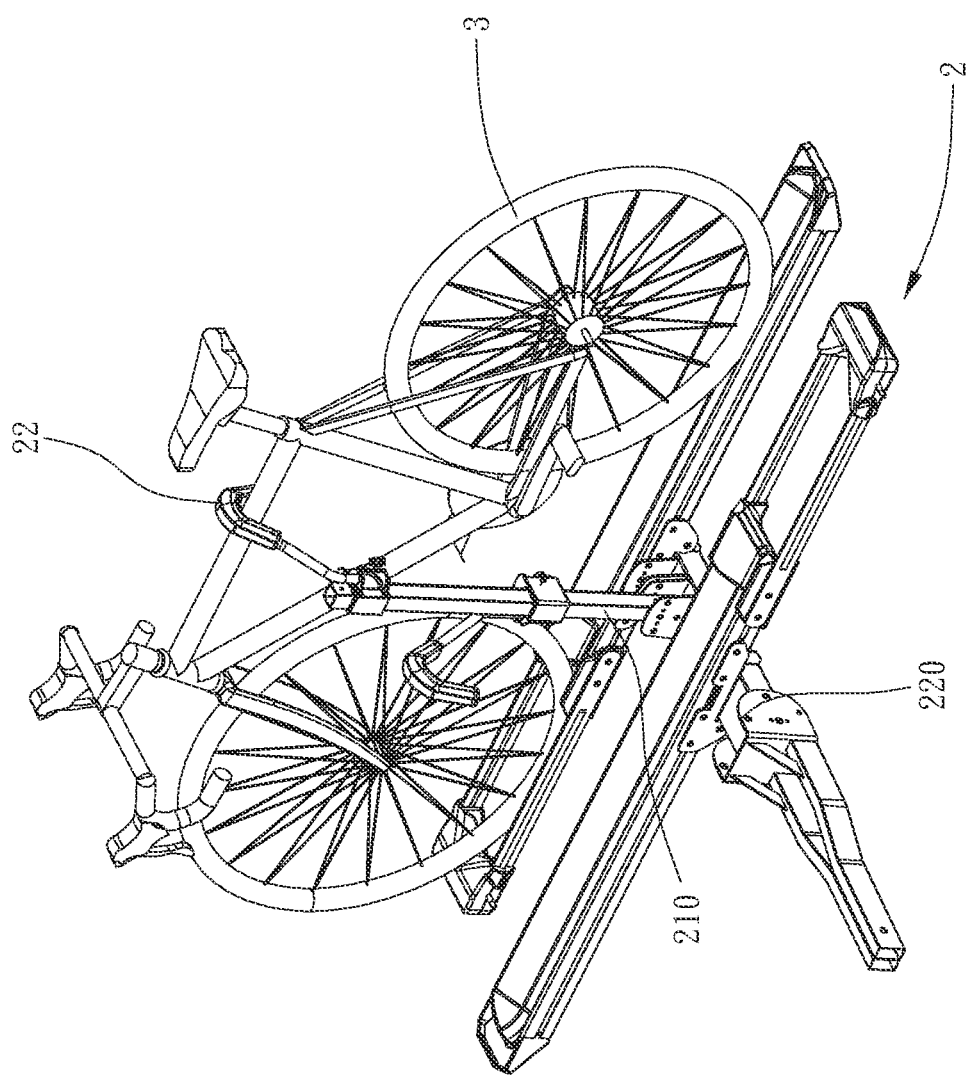
Figure 8:
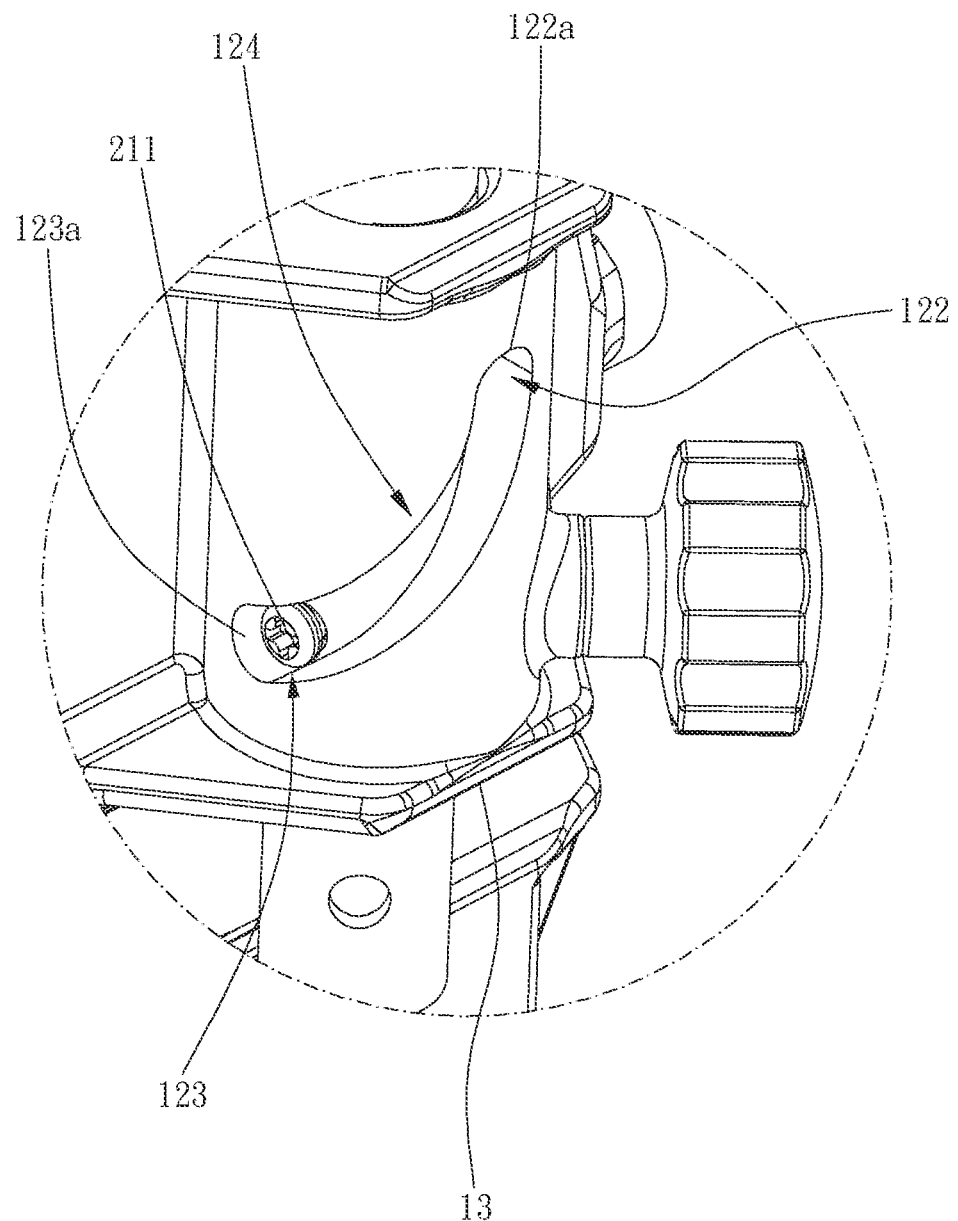
FIG. 8 is a partial enlargement of FIG. 6.

One of the first guiding portion 12 and the second guiding portion 21 includes at least one guiding recess, and the other of the first guiding portion 12 and the second guiding portion 21 includes at least one guiding projection corresponding to the at least one guiding recess, which provides guiding and positioning effects. In this embodiment, the first guiding portion 12 includes an arcuate groove 121 extending arcuately, and the arcuate groove 121 penetrates through the barrel 111 and includes a first end portion 122 and a second end portion 123. The first end portion 122 is higher than the second end portion 123 in the axial direction A relative to the outermost bottom surface 13 so as to provide axial movement of the stem member 20. The second guiding portion 21 includes the at least one guiding projection 211 movable within the arcuate groove 121, and the at least one guiding projection 211 is detachably and protrudingly disposed on an outer circumferential wall of the stem member 20, which has a simple structure and is easy to process. The first end portion 122 and the second end portion 123 have respective abutting surfaces 122a, 123a, and each of respective abutting surfaces 122a, 123a is abuttable against the second guiding portion 21 in an extending direction of the arcuate groove 121 so as to avoid over-swinging of the stem member 20 and provide good positioning effect. The stem member 20 further includes a hooked portion 22. When the at least one guiding projection 211 is located at the first end portion 122, the stem member 20 is in the restricted position, and the hooked portion 22 is configured to restrict a rod member of the bicycle 3, as shown in FIGS. 1 and 7. When the at least one guiding projection 211 is located at the second end portion 123, the stem member 20 is in the release position, which avoids interference of the hooked portion 22 and the bicycle 3 for easy loading and unloading, as shown in FIGS. 6 and 8. Therefore, when the stem member 20 is rotating relative to the base 10, the first guiding portion 12 and the second guiding portion 21 simultaneously guide the stem member 20 to move relative to the base 10 in the axial direction A so that the hooked portion 22 is convenient to engage with or disengaged from the rod member. Preferably, an arc mouth 124 of the arcuate groove 121 faces toward a side of the axial direction A remote from the outermost bottom surface 13. When the hooked portion 22 is free of interference with the rod member, the stem member 20 is automatically swung to the release position due to gravity and the arcuate groove 121, which is convenient to load and unload the bicycle 3. However, the arcuate groove may be disposed on other positions of the base or disposed on the stem member; the first guiding portion may be a straight groove, an inclined groove, an arcuate groove with multiple curvatures, or a groove with multiple corners; the first end portion may be lower than the second end portion.

Figure 4:
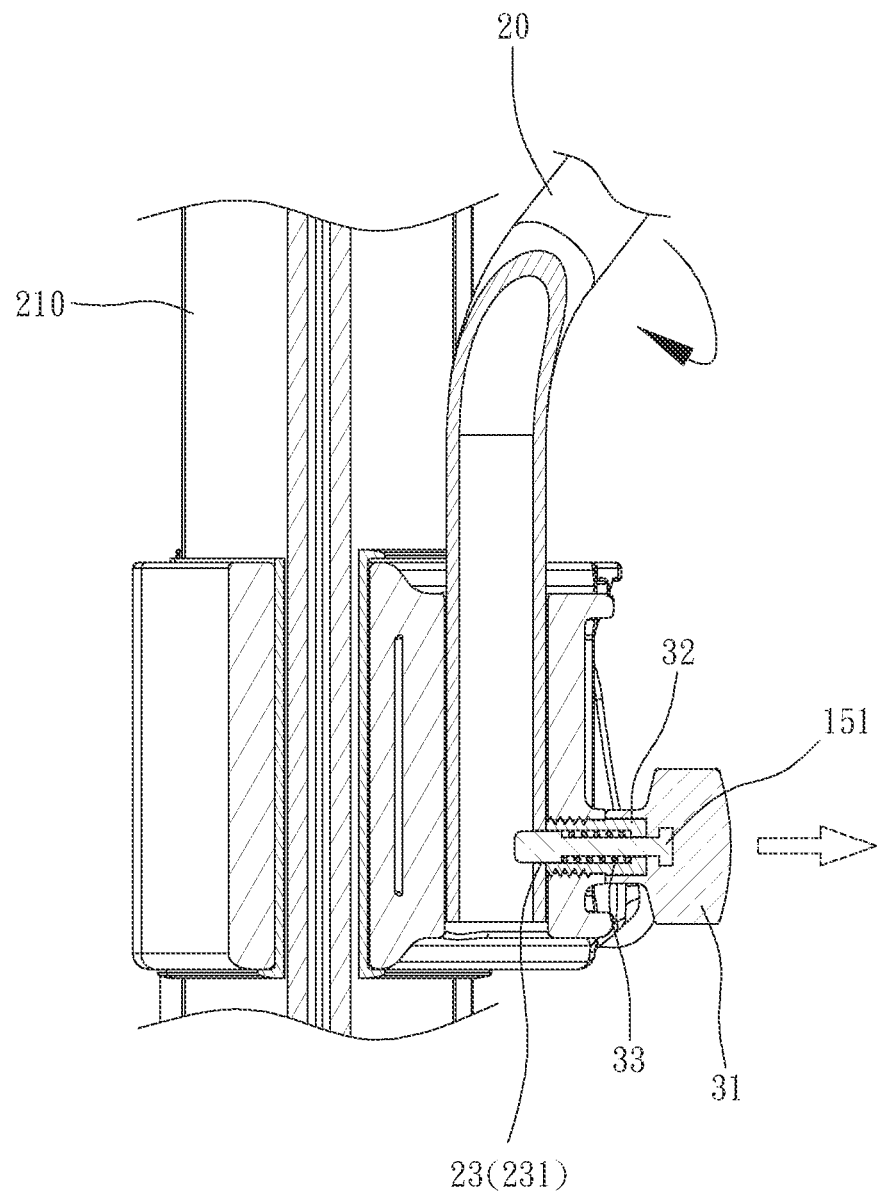
FIG. 4 is a drawing showing operation of an operation assembly according to a preferable embodiment of the present invention.
Figure 5:
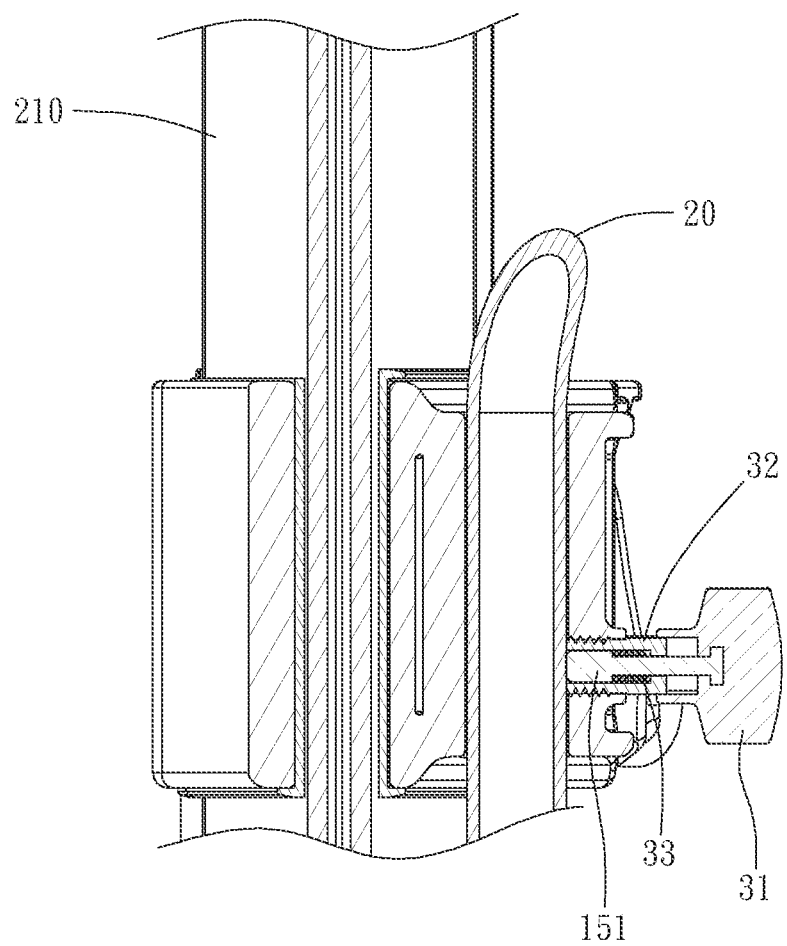
FIG. 5 is a partial cross-sectional view of a preferable embodiment of the present invention when a first engaging portion is disengaged from a second engaging portion.

Preferably, the base 10 further includes a first engaging portion 15, and the stem member 20 further includes a second engaging portion 23 releasably engaged with the first engaging portion 15 so as to avoid unexpected movement of the stem member 20. When the first engaging portion 15 is engaged with the second engaging portion 23, the base 10 and the stem member 20 are unmovable relative to each other, as shown in FIG. 4. When the first engaging portion 15 is disengaged from the second engaging portion 23, the base 10 and the stem member 20 are movable relative to each other, as shown in FIG. 5. Specifically, the first engaging portion 15 is disposed on the sleeve portion 11 and includes at least one engaging projection 151 radially retractable, and the second engaging portion 23 includes at least one engaging recession 231 recessed on the outer circumferential wall of the stem member 20. The at least one engaging projection 151 is correspondingly engaged within the at least one engaging recession 231. In this embodiment, the first engaging portion 15 and the second engaging portion 23 can restrict rotation and axial movement of the stem member 20 relative to the base 10. In other embodiments, rotation and axial movement of the stem member relative to the base may be restricted by two mechanisms unrelated to each other, respectively.

In this embodiment, the vehicle restriction mechanism 1 further includes an operation assembly 30, and the first engaging portion 15 is drivable by the operation assembly 30. The operation assembly 30 includes an operating member 31 configured to be externally operable and connected with the first engaging portion 15, a sleeve member 32 sleeved with the operating member 31 and an elastic member 33. The sleeve member 32 is immovably disposed on the sleeve portion 11, and the elastic member 33 is elastically abutted against and between the sleeve member 32 and one of the operating member 31 and the first engaging portion 15 so that the first engaging portion 15 has a tendency to move in a direction toward the second engaging portion 23. In this embodiment, the elastic member 33 is elastically abutted against and between the first engaging portion 15 and the sleeve member 32. The at least one engaging projection 151 is a pin penetrating through the sleeve member 32, and the pin is connected with the operating member 31 and axially unmovable relative to the operating member 31. The at least one engaging recession 231 is a restriction hole. When the stem member 20 is in the restricted position, the pin is engagingly disposed within the restriction hole, and the pin is releasable from the restriction hole by pulling the operating member 31, which has a simple structure and stable engagement and is easy to operate. Moreover, when the stem member 20 is rotatably moved from the release position to the restricted position, the pin corresponds to the restriction hole and is urged by the elastic member 33 for automatic engagement. In other embodiments, the stem member may have a plurality of said restriction holes spaced apart from one another, and the pin may be engagingly disposed within one of the plurality of said restriction holes to position the stem member; and the first engaging portion and the second engaging portion may be other structures that can be adjusted and positioned with each other, such as pins and holes, rollers and engaging recessions, ratchets, etc., so that the stem member is adjustably positioned in multiple stages.

Specifically, the sleeve portion 11 has a screw hole 113 radially penetrating therethrough and communicated with an interior of the barrel 111, and the sleeve member 32 includes a threaded section 321 screwed to the screw hole 113 and a polygonal section 322 connected with the threaded section 321. The operating member 31 is non-rotatably sleeved with the polygonal section 322 and is axially movable relative to the polygonal section 322 so that the operation assembly 30 can be assembled or disassembled by rotating the operating member 31. Preferably, the screw hole 113 is lower than the first end portion 122 in the axial direction A so as to have good load-bearing effect; the arcuate groove 121 is dislocated with the operation assembly 30 as viewed in the axial direction A, which is conductive to arrangement of elements and is convenient to operate. However, the operation assembly may be configured by a knob and the screw hole, and the pin is movable relative to the restriction hole by rotation of the knob.

The present invention further provides a vehicle carrier 2, including at least one of the vehicle restriction mechanism 1 as described above, further including: a carrying frame 220, having the supporting arm 210 and configured for at least one of the bicycle 3 to disposed thereon. The stem member 20 is configured to restrict one said bicycle 3. Preferably, the base 10 is slidably disposed on the supporting arm 210; the base 10 includes a first positioning portion, and the supporting arm 210 includes a second positioning portion engaged with the first positioning portion for easy adjustment and positioning. Moreover, the first positioning portion and the sleeve portion 11 are located at two different sides of the seat portion 14, which is convenient to arrange and operate.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle restriction mechanism, configured to be disposed on a supporting arm of a vehicle carrier, including:
   a base, configured to be disposed on the supporting arm and including a sleeve portion, the sleeve portion defining an axial direction; and
   a stem member, adjustably and positionably disposed on the sleeve portion, the stem member being rotatable about the axial direction relative to the base between a restricted position and a release position;
   wherein the base has a first guiding portion, the stem member has a second guiding portion movably connected with the first guiding portion; relative to an outermost bottom surface of the base, heights of at least two parts of the first guiding portion being different in the axial direction; when the stem member is rotated relative to the base, the second guiding portion is moved relative to the first guiding portion and drives the stem member to move relative to the base in the axial direction;
   wherein the base further includes a first engaging portion, the stem member further includes a second engaging portion releasably engaged with the first engaging portion; when the first engaging portion is engaged with the second engaging portion, the base and the stem member are unmovable relative to each other; and when the first engaging portion is disengaged from the second engaging portion, the base and the stem member are movable relative to each other;
   wherein the first engaging portion is disposed on the sleeve portion and includes at least one engaging projection radially retractable, the second engaging portion includes at least one engaging recession recessed on an outer circumferential wall of the stem member, and the at least one engaging projection is correspondingly engaged within the at least one engaging recession.

2. The vehicle restriction mechanism of claim 1, wherein the first guiding portion includes an arcuate groove extending arcuately, the arcuate groove includes a first end portion and a second end portion, and the first end portion is higher than the second end portion in the axial direction relative to the outermost bottom surface.

3. The vehicle restriction mechanism of claim 2, wherein an arc mouth of the arcuate groove faces toward a side of the axial direction remote from the outermost bottom surface.

4. The vehicle restriction mechanism of claim 2, wherein the second guiding portion includes at least one guiding projection being movable within the arcuate groove, when the at least one guiding projection is located at the first end portion, the stem member is in the restricted position; and when the at least one guiding projection is located at the second end portion, the stem member is in the release position.

5. The vehicle restriction mechanism of claim 1, further including an operation assembly, wherein the first engaging portion is drivable by the operation assembly, the operation assembly includes an operating member configured to be externally operable and connected with the first engaging portion, a sleeve member sleeved with the operating member and an elastic member, the sleeve member is immovably disposed on the sleeve portion, and the elastic member is elastically abutted against and between the sleeve member and one of the operating member and the first engaging portion.

6. The vehicle restriction mechanism of claim 1, wherein the base further includes a seat portion configured to be sleevingly disposed on the supporting arm, the sleeve portion includes a barrel and at least one flange radially extending from the barrel and connected with the seat portion, and the stem member is rotatably disposed within the barrel.

7. The vehicle restriction mechanism of claim 5, wherein the first guiding portion includes an arcuate groove extending arcuately, the arcuate groove penetrates through the barrel and includes a first end portion and a second end portion, and the first end portion is higher than the second end portion in the axial direction relative to the outermost bottom surface; an arc mouth of the arcuate groove faces toward a side of the axial direction remote from the outermost bottom surface; the first end portion and the second end portion have respective abutting surfaces, and each of the respective abutting surfaces is abuttable against the second guiding portion in an extending direction of the arcuate groove; the second guiding portion includes at least one guiding projection being movable within the arcuate groove, the at least one guiding projection is detachably and protrudingly disposed on an outer circumferential wall of the stem member; when the at least one guiding projection is located at the first end portion, the stem member is in the restricted position; when the at least one guiding projection is located at the second end portion, the stem member is in the release position; the at least one engaging projection is a pin penetrating through the sleeve member, the pin is connected with the operating member and axially unmovable relative to the operating member; the at least one engaging recession is a restriction hole; when the stem member is in the restricted position, the pin is engagingly disposed within the restriction hole; the base further includes a seat portion configured to be sleevingly disposed on the supporting arm, the sleeve portion includes a barrel and two flanges radially extending integrally from the barrel and connected with the seat portion, and the stem member is rotatably disposed within the barrel; an outer contour of each of the two flanges is trapezoidal and gradually expands toward the seat portion; the seat portion and the sleeve portion are integrally formed as one piece; the sleeve portion has a screw hole radially penetrating therethrough and communicated with an interior of the barrel, the sleeve member includes a threaded section screwed to the screw hole and a polygonal section connected with the threaded section, the operating member is non-rotatably sleeved with the polygonal section and is axially movable relative to the polygonal section; the screw hole is lower than the first end portion in the axial direction; the elastic member is elastically abutted against and between the first engaging portion and the sleeve member; and the arcuate groove is dislocated with the operation assembly as viewed in the axial direction.

8. A vehicle carrier, including at least one of the vehicle restriction mechanism of claim 1, further including:
    a carrying frame, having the supporting arm and configured for at least one bicycle to disposed thereon, the stem member configured to restrict the at least one bicycle.

\* \* \* \* \*